US011693537B2

(12) United States Patent
Lees et al.

(10) Patent No.: US 11,693,537 B2
(45) Date of Patent: Jul. 4, 2023

(54) WINDOW PLACEMENT IN A VISUAL DISPLAY

(71) Applicant: International Business Machines Corporation, Armonk, NY (US)

(72) Inventors: Andrew M. Lees, Ferndown (GB); Aaron T. R. Gashi, Eastleigh (GB); Samuel B. Hawker, Winchester (GB); Aaron Collins, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 16/207,508

(22) Filed: Dec. 3, 2018

(65) Prior Publication Data
US 2020/0174631 A1 Jun. 4, 2020

(51) Int. Cl.
*G06F 3/0483* (2013.01)
*G06F 9/451* (2018.01)
(52) U.S. Cl.
CPC ............ *G06F 3/0483* (2013.01); *G06F 9/451* (2018.02)
(58) Field of Classification Search
CPC ...... G06F 16/212; G06F 3/038; G06F 3/0481; G06F 9/452; G06F 3/1454; G06F 2203/0383; G06F 3/03543; G06F 3/04845; G06F 3/1415; G06F 3/0485; G06F 3/0486; G06F 3/1423; G06F 3/0482; G06F 3/04842; G06F 3/023; G06F 3/0354; G06F 3/04812; G06F 3/04817; G06F 3/0484; G06F 3/0488; G06F 9/451; G06F 16/958; G06F 2203/04808; G06F 3/0236; G06F 3/03; G06F 3/14; G06F 3/1431; G06F 3/1446; G06F 11/3409; G06F 11/3438; G06F 15/00; G06F 15/16; G06F 2201/81; (Continued)

(56) References Cited

U.S. PATENT DOCUMENTS 5,796,402 A * 8/1998 Ellison-Taylor ......... G09G 5/14
715/792
7,844,917 B2 11/2010 Rigolet
(Continued)

OTHER PUBLICATIONS

"Maintaining sizes and positions of application upon startup", MesPia, Microsoft Community, Last updated Nov. 9, 2018, 12 pages, <https://answers.microsoft.com/en-us/windows/forum/windows_10-start-winpc/maintaining-sizes-and-positions-of-application/9ef08f14-4071-4482-961d-2d47e0b54b05>.
(Continued)

*Primary Examiner* — Rayeez R Chowdhury
(74) *Attorney, Agent, or Firm* — Peter J. Edwards (57) ABSTRACT

A method, computer program product, and system are provided for window placement in a visual display of a data processing system. A computer gathers data of user preferences of size and position of windows in a visual display through use of the visual display, wherein windows relate to resources accessed by a user of the data processing system. Upon a new display action, the computer determines a current context of the visual display, wherein the current context includes existing windows in the visual display. The computer applies the data of user preferences to the new display action to provide an updated display context, wherein the applying includes influencing one or more sizes and one or more positions of one or more windows in the visual display.

18 Claims, 4 Drawing Sheets

(58) Field of Classification Search
CPC ..... G06F 2203/04801; G06F 2209/509; G06F 3/013; G06F 3/017; G06F 3/048; G06F 3/04855; G06F 3/04883; G06F 3/147; G06F 8/24; G06F 9/06; G06F 9/455; G06F 9/4881; G06F 9/5088
See application file for complete search history.

(56) References Cited

U.S. PATENT DOCUMENTS

| | | | |
|---|---|---|---|
| 9,658,732 B2 | 5/2017 | Ording | |
| 9,703,445 B2 | 7/2017 | Brown | |
| 2002/0089546 A1* | 7/2002 | Kanevsky | G06F 3/0481 715/800 |
| 2009/0327915 A1 | 12/2009 | Holdaway et al. | |
| 2012/0096396 A1* | 4/2012 | Ording | G06F 3/04883 715/799 |
| 2012/0324396 A1* | 12/2012 | Baartman | G06F 9/451 715/788 |
| 2015/0199092 A1* | 7/2015 | Kuscher | G09G 5/14 715/788 |
| 2015/0356773 A1* | 12/2015 | Kumar | G09G 5/14 345/520 |

OTHER PUBLICATIONS

"Stay", Cordless Dog, Copyright © 2018 Cordless Dog, 2 pages, <https://cordlessdog.com/stay/>.

"The window manager you didn't know you missed", MaxTo, Last printed Nov. 9, 2018, 7 pages, <https://maxto.net/?from=winsplit-revolution.com/>.

"WinSize2 moves and resizes windows", Sourceforge, V 2.10 (Sep. 15, 2008), 7 pages, <http://winsize2.sourceforge.net/en/index.html>.

Ahmed, Waqas, "AutoSizer Automatically Resizes & Repositions Application Windows On Launch", Dec. 4, 2013, 4 pages, <https://www.addictivetips.com/windows-tips/autosizer-auto-resize-reposition-program-windows-onlaunch/>.

Patel, Jigish, "Slate: A window management application (replacement for Divvy/SizeUp/ShiftIt)", GitHub, Last printed Nov. 9, 2018, 16 pages, <https://github.com/jigish/slate>.

Microsoft, "GetSystemMetrics function (winuser.h)," Windows App Development, Jul. 27, 2022, 15 pages, https://learn.microsoft.com/en-us/windows/win32/api/winuser/nf-winuser-getsystemmetrics?redirectedfrom=MSDN.

Archive of Microsoft, "GetSystemMetrics function (winuser.h)," Windows App Development, Oct. 4, 2018, 17 pages, (available at: https://web.archive.org/web/20181110004831/https://docs.microsoft.com/en-us/windows/desktop/api/winuser/nf-winuser-getsystem-metrics) (original URL: https://docs.microsoft.com/en-us/windows/desktop/api/winuser/nf-winuser-getsystemmetrics).

\* cited by examiner

WINDOW PLACEMENT IN A VISUAL DISPLAY

BACKGROUND

When doing work on a computer, a user will often be working across multiple applications. Rather than having only one application open in full screen mode at a time, a user will often have these windows laid out in such an arrangement that the user can see multiple applications at any one time, making the applications easy to access and viewable without having to do any switching to improve user productivity. The same can be said about websites, where a user may have multiple websites open in different browser windows.

Currently, a user has to manually position and resize these windows, on either a single desktop or multiple desktops and either on a single monitor or multiple monitors, to fit their preference. Opening another application window may place it at a default position and size. If this position and size does not match the user's preference, the user has to manually move that window to where they want it, which may involve having to reorganize and resize other windows.

For some modern operating systems, the default position and size are the place where the application was closed last. Using the position the application was closed last can cause user annoyance since it may now cover another application the user is using. The desired size of an application window when a user starts using it and when they finish can be different.

SUMMARY

According to an aspect of the present disclosure there is provided a computer-implemented method for window placement, comprising: gathering data of user preferences of size and position of windows in a visual display through use of the visual display, wherein windows relate to resources accessed by a user of a data processing system; determining, upon a new display action, a current context of the visual display, wherein the current context includes existing windows in the visual display; and applying the data of user preferences to the new display action to provide an updated display context, wherein the applying includes influencing one or more sizes and one or more positions of one or more windows in the visual display.

According to another aspect of the present disclosure there is provided a system for window placement, comprising: one or more processors and a memory communicatively coupled to the one or more processors, wherein the memory comprises instructions which, when executed by the one or more processors, cause the one or more processors to perform a method comprising: gathering data of user preferences of size and position of windows in a visual display through use of the visual display, wherein windows relate to resources accessed by a user of a data processing system; determining, upon a new display action, a current context of the visual display, wherein the current context includes existing windows in the visual display; and applying the data of user preferences to the new display action to provide an updated display context, wherein the applying includes influencing one or more sizes and one or more positions of one or more windows in the visual display.

According to a further aspect of the present disclosure there is provided a computer program product for window placement, the computer program product comprising a computer readable storage medium having program instructions embodied therewith, the program instructions executable by a processor to cause the processor to: gather data of user preferences of size and position of windows in a visual display through use of the visual display, wherein windows relate to resources accessed by a user of a data processing system; determine, upon a new display action, a current context of the visual display, wherein the current context includes existing windows in the visual display; and applying the data of user preferences to the new display action to provide an updated display context, wherein the applying includes influencing one or more sizes and one or more positions of one or more windows in the visual display.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The described method, computer program product, and system provide window placement for resource windows in a visual display of a computer or data processing system. Embodiments of this disclosure provide for gathering data of the user's preferred layouts based on the type of resources being used and the size and positions in which the user usually has the resource windows displayed. The resources may be applications, operating system windows, or other resources represented by a window.

As used herein, a new display action can be an action affecting placement of one or more resource windows on one or more displays, such as opening a resource window or adding or removing another display monitor. When a new display action occurs, embodiments of this disclosure provide for referencing an aggregation of the user preferences to determine the position where the user might want window(s) displayed and the size of those window(s) and applies the preferences while taking into account existing windows that are displayed.

When the new display action is access to a resource by opening a resource window, opening the window is carried out in a size and at a location determined as a function of the data stored including data for the window during previous accesses to the resource and using an algorithm to determine where the user would prefer to have the resource window open and what size it should be.

When the new display action adds or removes a display screen or monitor from a user's display setup, the user preferences for window size and location of resources in the overall display are accommodated. For example, removing a monitor may result in condensing all open windows into one monitor, while adding a new monitor expands the position of open windows into their preferred places on the new monitor.

Figure 1:
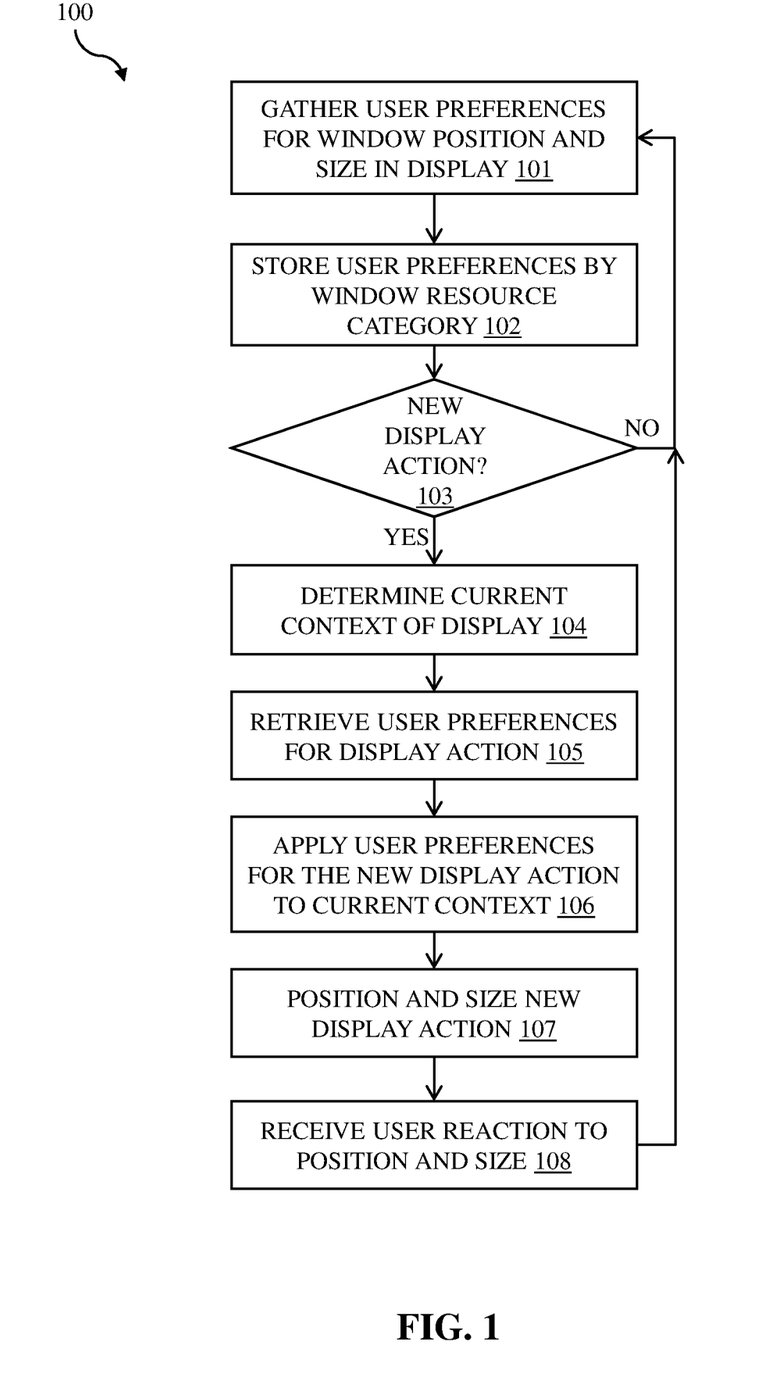
FIG. 1 is a flow diagram of an example method for window placement in a visual display in accordance with some embodiments of the present disclosure.

Referring to FIG. 1, a flow diagram shows an example method 100 for window placement in a visual display in accordance with some embodiments of the present disclosure. In some embodiments, method 100 may be performed by an application or a service at the operating system level, which may run in the background while a user is using the computing device. In other embodiments, method 100 can be an application or service at a different level. In the following discussion, method 100 will be referred to as being performed by a window service, but this is not to be read as limiting method 100.

At 101, the window service may gather data of user preferences of size and position of windows in a visual display of a computing device. The position may include overlapping of windows and ordering of windows where overlapping. The visual display may include one or more display monitors across which the windows are positioned.

In some embodiments, operation 101 may be performed by gathering data from a windows manager of the operating system of the computing device. A windows manager may keep track of open windows and their size and position.

In some embodiments, the gathering of data of user preferences at 101 may be by gathering data using periodic screen capture or screen scraping techniques of the visual display. For example, this may occur at regular intervals or when a new display action takes place that changes the window display.

Periodic screen capture techniques include taking "snapshots" of the current state of all application windows currently open in the visual display. These snapshots can be analyzed by object recognition and image segmentation to determine which parts of the image are windows and to extract information including the application name, its size, position, and a monitor the window is displayed on. The number of monitors may also be recorded with the snapshot. In some embodiments, the number of monitors may be detected by consulting a device manager or detecting inputs into graphics ports on the computing device.

The data gathering of user preferences at 101 does not require specific user input but relies on usual user interaction with windows in the display, including user movement of windows when opened or during use. The data can be gathered and preferences learned though historical user interaction of the visual display of resources and updated as the user continues to interact with the visual display of resources.

At 102, the window service may store user preferences by a category of window resource. This may involve receiving categorization or tagging of windows as belonging to a category of resources. The categorization or tagging may be carried out by automatic determination of a type of resource or by manual user input. In some embodiments, tags may be assigned to group applications together based on what the applications are used for. For example, different web browser may be given a "web browser" tag, while different code editors may be given a "code editor" tag, etc.

In some embodiments, the window service may use a remote database to store and retrieve tags for different known resources that may be available to multiple users and which may be updated by viewing data of how individual users have tagged applications in their local system. In some embodiments, the user's tagging of applications can override any tags retrieved from a remote database. In some embodiments, tags may only be retrieved from a remote database when an application which the user has not tagged is detected.

The stored data may include the size and position of each window and which monitor it is placed on (if more than one monitor is present) along with the application name and tag. Collectively, the stored data may provide an automatically gathered history of the user's window size and position configurations building a profile of the user preferences.

At 103, the window service may determine that a new display action has occurred, resulting in a change to the arrangement of windows in the visual display. This new display action may be, for example, opening a resource window or adding or removing a monitor. If no new display action is carried out, method 100 may loop back to operation 101 to continue gathering the user preferences.

At 104, the window service may determine the current context of the display at the time of the new display action. This may entail capturing details of the currently open windows and, optionally, what type of data the windows are displaying. For example, the current context of the display may include: size and positions of open windows, the position and activity of the mouse on the display, which parts of the screen are changing such as a video playing, and any empty space on the display.

At 105, the window service may retrieve user preferences from the stored data relating to the new display action. At 106, the window service may apply the user preferences for the display action in the current display context. Applying the user preferences may include applying the user preferences with consideration of the current context of the display.

At 107, the window service may position and size the windows in the new display action. Upon a new display action, such as opening a new window, the user's preference profile can be combined with the current configuration of open windows as parameters to a function, which determines how the new display action will be displayed. In the case of the new display action being a new window opening this determines where the new application will be opened and what size and can also include moving and/or resizing existing windows.

In some embodiments where a new display action is opening a new window, the method may use an algorithm which takes an aggregation of the user preference data to determine where the user would prefer to have a window open and at what size, taking into account the current context of the visual display, before opening the new window at or close to the preferred position and size in the visual display. In some embodiments, this may be carried out using a machine learning technique, such as a neural network, and the window service may predict where the user would prefer the window to be opened and what size it should be.

The input parameters for the algorithm may include: the gathered data for previous occurrences of when the resource for the new window was previously running, including the size and positions of other windows and the number of monitors, and the current context of the display, including the size and positions of open windows, the position and activity of the mouse on the display, which parts of the display are changing such as a video playing, any empty space on the screen, etc. The algorithm may attempt to match the current context of the display to a previous snapshot where the resource was running to decide a size and position in which to open the resource window.

In situations where more data is required, such as when opening a newly installed program or when there is not enough previously gathered data, resources which share the same tag may be substituted for matching the context and the algorithm may be run as if it is for another resource which has the same tag.

In some embodiments, existing windows in the current context may be moved to make the screen match a previous context or more closely align with the user preferences according to the windows that will be open after the new display action. The algorithm may prioritize space in the visual display that is currently not being used and may safeguard space in the visual display where the mouse is currently located or in which there is a running video or other movement.

Data about the preferred sizes and positions for specific resource windows may be gathered from other users, stored on a remote database, and factored into the algorithm. Data gathered from other users may be given a lower weight or priority in the algorithm or may only be used when data does not exist for the current user of the computing device (e.g., when an application is first used or when a user first uses a computing device).

At 108, the window service receives a user reaction to the position and size of the windows in the new display action and may add this to the gathered user preferences for future reference. Once a new resource window opens, the system learns from the user's reactions to the newly opened window to improve its future runs of the algorithm.

For example, if a user moves a window further away from where it was originally placed and/or resizes it, this can indicate to the window service that the user disliked its prediction and so it will factor this into future predictions for that application, by adjusting the weightings of the algorithm. If, for example, the user only moves/resizes the window slightly or does not move it at all then this confirms the system's prediction of where and what size the user wants the window to be placed, which the window service will attempt to follow next time it opens the given resource. Other user reactions are possible in accordance with this disclosure, including a user providing direct feedback to the window service (e.g., entering data into a user interface for the window service).

In some embodiments, the window service may use machine learning techniques to create a decision tree from the size and position of windows taken from the screenshots or from the window management data. Example actions that the window service may take using the decision tree can be as follows. When a new window is opened, the window service may go through the decision tree for the currently open windows with their position and the window being opened (excluding its positional data). At the bottom of the tree the window service may reach the nearest matching window layout for the current context. Nearest matching may be calculated by the layout that requires least movement of windows to create. If no direct match of applications is found, then the window service finds a match for applications with corresponding tags. The window service then moves the open windows to their expected position from the tree. The resource that is being opened is then positioned at the expected position for the user.

In the example of the decision tree, user feedback of a new window may be implemented as follows. In a set time period (for example, 30 seconds), if the windows are rearranged, this new layout is added to the tree and the previous layout's weighting is reduced. If the windows are not moved, then the layout's weighting is increased. Further machine learning techniques such as decision forests and pruning can be applied to improve accuracy.

In some embodiments where the new display action is the addition of another monitor, the user preferences may be to enlarge the existing windows and spread them across the existing and additional monitors in an arrangement preferred by the user. For example, some types of resource may be preferred by the user to be displayed on the additional monitor and others on a main or central monitor. The sizes of the windows may be enlarged or reduced in a corresponding ratio to prior to the new display action to make use of additional or restricted display areas. When adding another monitor, the window service may effectively run the open-window action again for the currently open windows but including the stored information about a preferred monitor.

The method 100 provides a cognitive element of determining the user's preferred arrangements based on previous displays and applies these preferences when opening a new window. The described method removes the need for any manual steps from the user. The method is reactive to the user moving windows and opening new ones and tries to determine the user's preferences cognitively.

Figure 2:
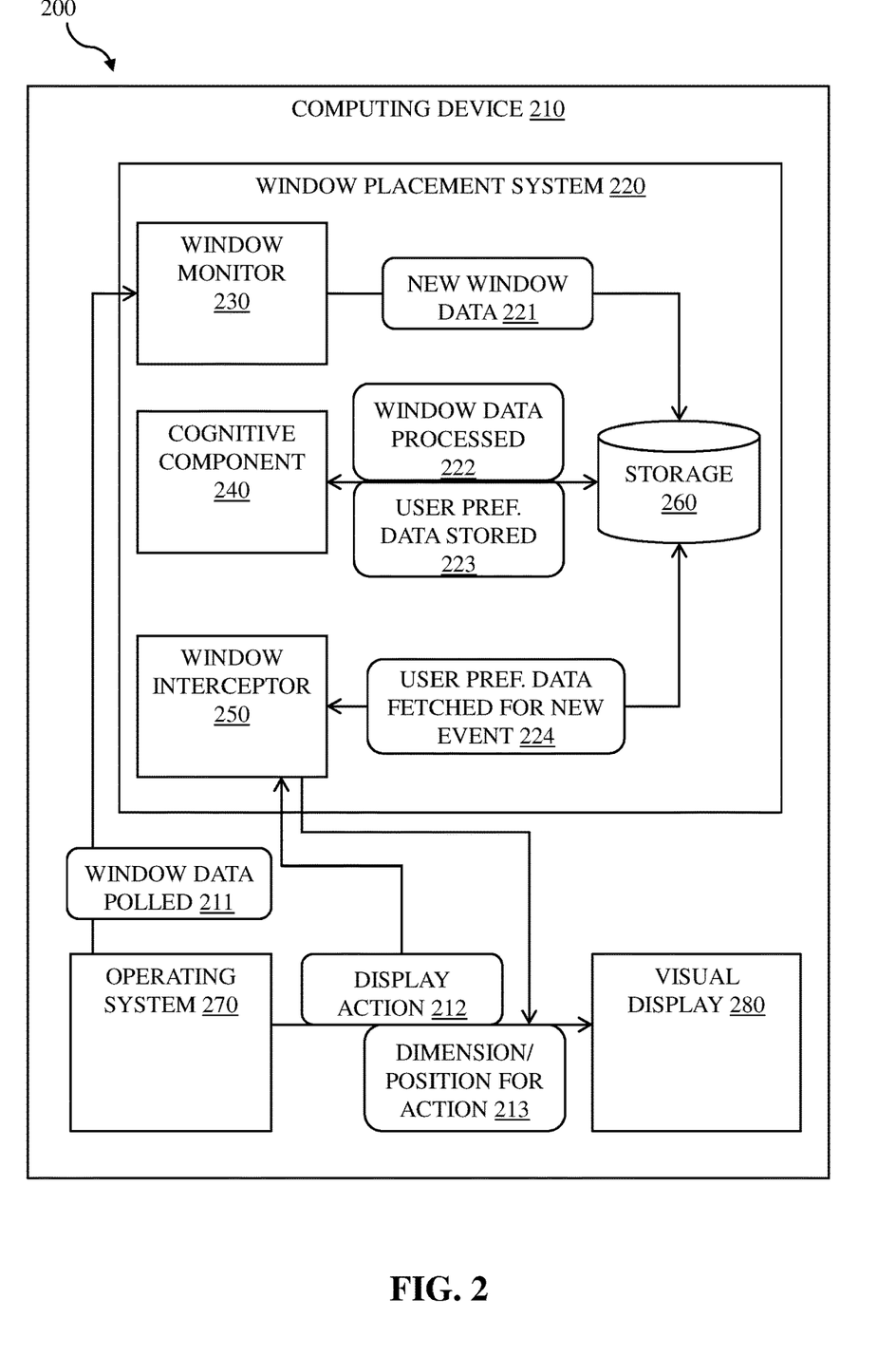
FIG. 2 is a block diagram illustrating an example system in accordance with some embodiments of the present disclosure.

Referring to FIG. 2, a block diagram shows an example system 200, in accordance with some embodiments of the present disclosure. FIG. 2 includes a computing device 210 with the described window placement system 220, which may be the window service described as performing method 100 of FIG. 1. The block diagram includes schematic flow illustrations of the described method.

The computing device 210 may include an operating system 270 and visual display 280. The visual display 280 may be adapted to accommodate one or more monitors providing the display across multiple monitors where this option is selected by a user of the computing device 210.

In some embodiments, the window placement system 220 may be an application or a service at the operating system level, which may run in the background while the user is using the computing device 210. The operating system may run this itself with full access privileges.

The window placement system 220 may include a window monitor 230, a cognitive component 240, and a window interceptor 250 as described further below. A storage 260 may be provided locally, remotely, or a combination of both locally and remotely to the window placement system 220 for storing and referencing data gathered and used by the window placement system 220.

As shown in block 211, the window monitor 230 may constantly read or poll data from the user's windows from the operating system 270 and/or visual display 280 and may determine what resource the window relates to. This component may poll the data of all open windows. As shown in block 221, the window monitor 230 may store new window data in the storage 260, which may occur e.g., if resource windows have moved. Information about windows can be taken from the windows manager of an operating system 270.

The storage 260 may store user preferences for window position and size and may be written/read by the window monitor 230, the cognitive component 240, and the window interceptor 250. Data structures in the storage 260 may contain window dimensions, position, resource name, tag, time of capture, etc.

The cognitive component 240 may process events and analyze data, as shown in block 222, to generate user preferences that are stored, as shown in block 223, and may learn from user actions after windows have changed. The cognitive component 240 and/or storage 260 may maintain listings of user preferences per resource and tag.

For resources that have no previous history but that have a tag, the cognitive component 240 may attempt to determine suitable position from resources with the same tag. For example, a first preference may be from a user database and a second could be from known data.

Stored user preferences may be validated by a user's reaction to a window placement. Weightings may be assigned to a window movement/resize event based on how soon the event occurred after the interceptor opened a new window. User window placement/resize events that happen shortly after a window is opened can be interpreted as a user reacting to the stored preference. If the user changes the window size/position dramatically, then this new position may have a larger weighting in affecting the stored preference. If the position/resize is relatively small, then this will validate that the preference is accurate (or close to accurate) and may improve confidence in the answer or a variation of the answer. If a user opens a resource and does not change the position/size (or modifies it only slightly) on multiple occasions, then the stored preference is validated.

The window interceptor 250 determines when a new display action has occurred, as shown in block 212, and intercepts the placement of windows in the display. For example, when the operating system attempts to open a resource, the window interceptor 250 component may intercept the action and fetch user preference data, shown in block 224, from the storage 260 and replace whatever size/position at which the operating system 270 was about to open the window with the size and position calculated using stored user preferences for that resource or action. This replacement of dimension/position for the action is shown in block 213. If there is no stored preference for this resource (i.e. an application being opened for the first time), but it has an associated tag for which a preference is stored, this preference may be used instead.

Figure 3:
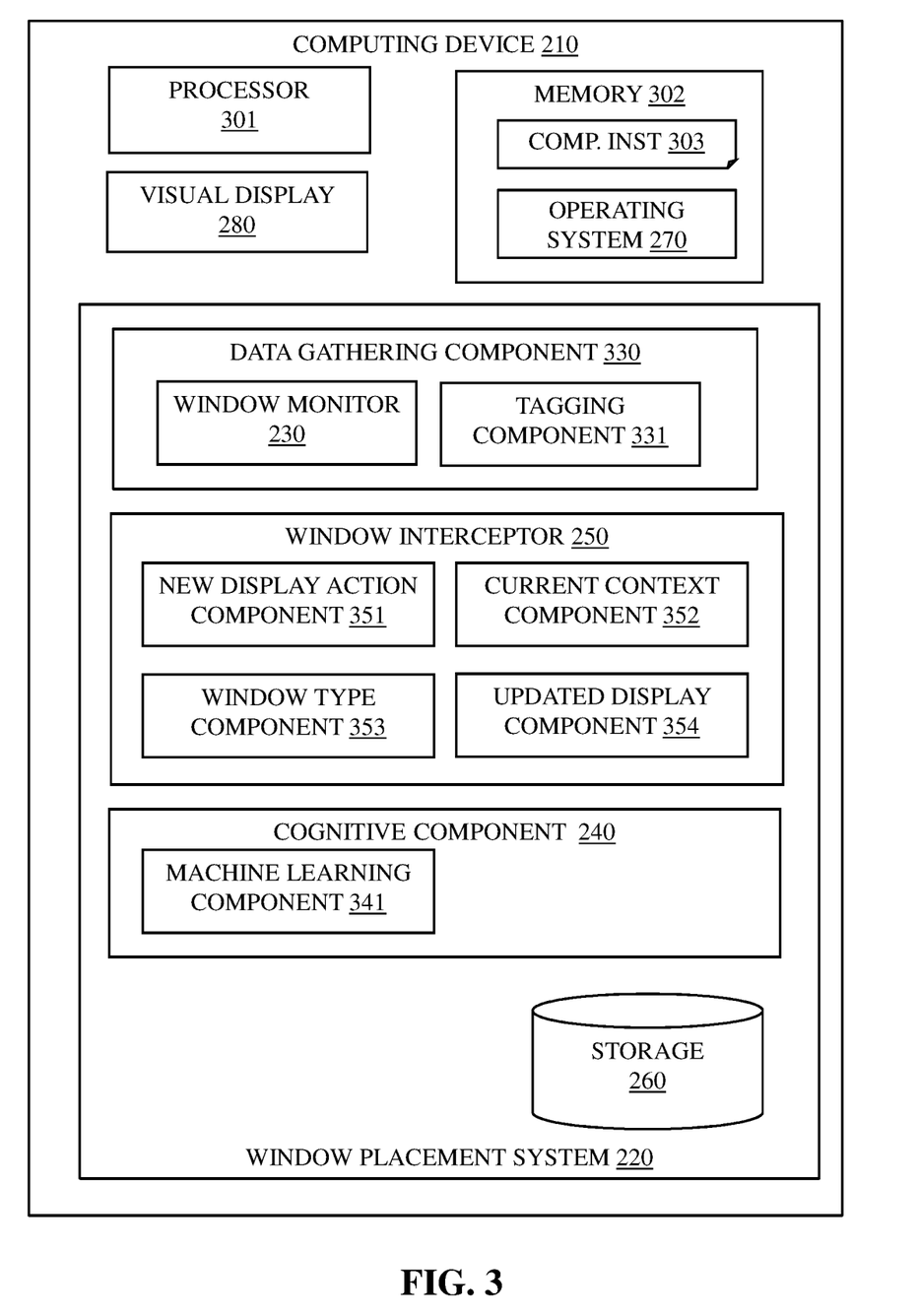
FIG. 3 is block diagram of an example system in accordance with some embodiments of the present disclosure.

Referring to FIG. 3, illustrated is a block diagram of an example system including computing device 210 having a visual display 280, in accordance with some embodiments of the present disclosure. Computing device 210 of FIG. 3 can be the same computing device 210 as in FIG. 2.

The computing device 210 may include at least one processor 301, which can be a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303, including the operating system 270, to the at least one processor 301 to carry out the functionality of the components.

Further details of the component of the window placement system 220 are shown. The window placement system 220 may include a data gathering component 330 for gathering data of user preferences of size and position of windows in the visual display 280. The data gathering component 330 may include a window monitor 230 for capturing and analyzing data from the visual display 280. The data gathering component 330 may also include a tagging component 331 for automatically or manually providing a category tag for resource windows and/or applications that correspond to resource windows. The data gathering component 330 may store the gathered and analyzed data from window monitor 230 and tagging component 331 in storage 260 in the computing device 210 or remotely accessible thereto.

The window placement system 220 also includes a window interceptor 250 for intercepting a new display action. The window interceptor 250 may include a new display action component 351 and a current context component 352. The new display action component 351 may be triggered by a new display action such as opening a new window for a resource or a change to the number of monitors in the visual display. The new display action component 351 may, upon a new display action, use the current context component 352 to determine a current context of the display including existing windows in the display. The current context component 352 may use a window type component 353 to determine a type of an existing window for consideration when rearranging existing windows. The window interceptor 250 may also include an updated display component 354 for updating the visual display 280 with applied user preferences as applied by the cognitive component 240.

The window placement system 220 includes cognitive component 240, which may include a machine learning component 341 for learning user preferences and applying these to resource windows in new display actions as applied by the updated display component 354. The cognitive component 240 may learn from the stored data gathered by the data gathering component 330. The cognitive component 240 may provide output to be applied by the updated display component 354 when the new display action component 351 is triggered by a new display event, while accommodating the current context of the display as provided by the current context component 352.

Figure 4:
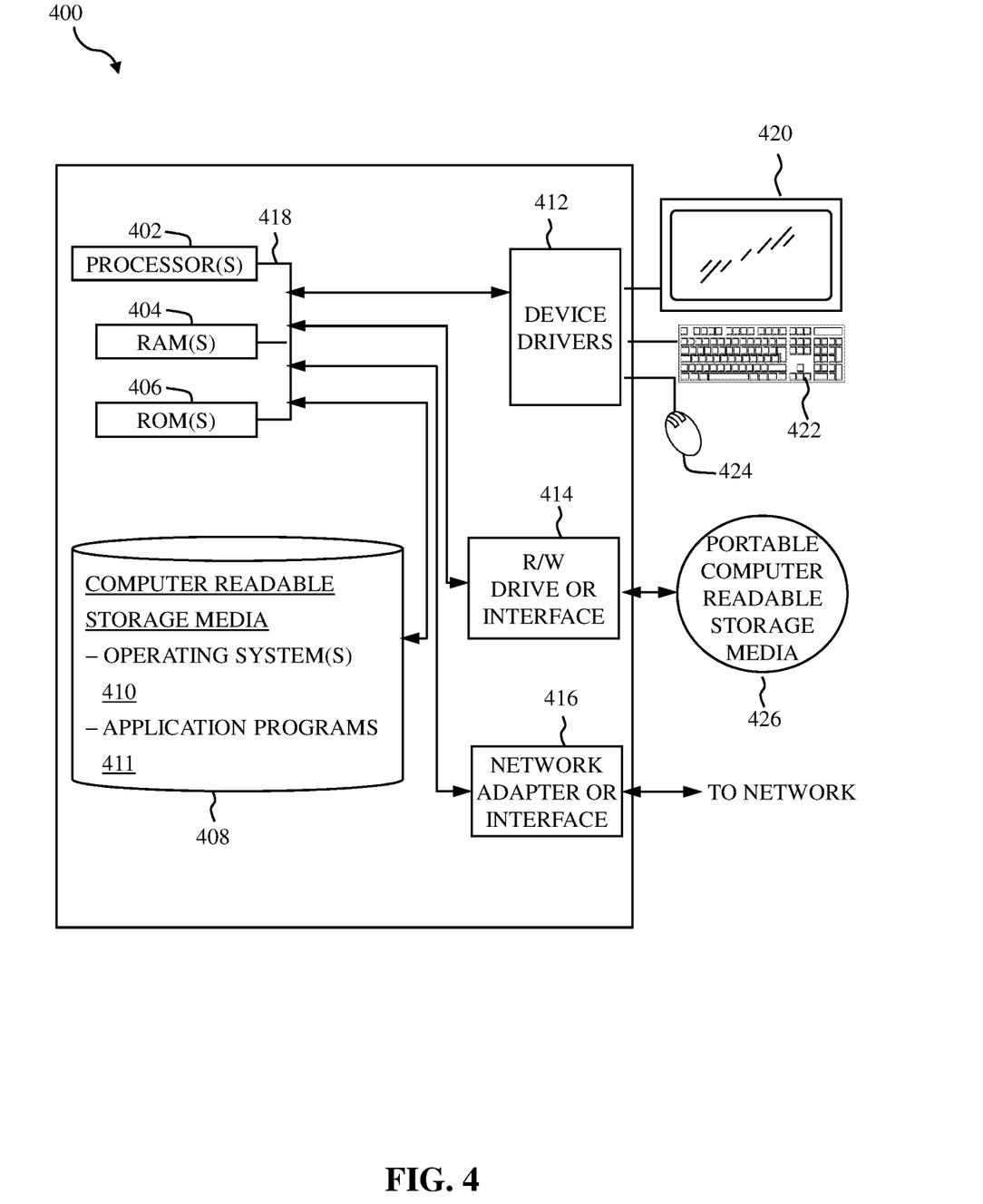
FIG. 4 is a block diagram of a computing device in which some embodiments of the present disclosure may be implemented.

FIG. 4 depicts a block diagram a computing device in which some embodiments of the present disclosure may be implemented. The computing device 400 of FIG. 4 may be the computing device 210 shown in FIG. 2 and FIG. 3. It should be appreciated that FIG. 4 provides only an illustration of some embodiments and does not imply any limitations with regard to the environments in which different embodiments may be implemented. Many modifications to the depicted environment may be made.

Computing device 400 can include one or more processors 402, one or more computer-readable RAMs 404, one or more computer-readable ROMs 406, one or more computer readable storage media 408, device drivers 412, read/write (R/W) drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the window placement system 220 are stored on one or more of the computer readable storage media 408 for execution by one or more of the processors 402 via one or more of the respective RAMs 404 (which can include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

Computing device 400 can also include a R/W drive or interface 414 to read from and write to one or more portable computer readable storage media 426. Application programs 411 on computing device 400 can be stored on one or more of the portable computer readable storage media 426, read via the respective R/W drive or interface 414 and loaded into the respective computer readable storage media 408.

Computing device 400 can also include a network adapter or interface 416, such as a TCP/IP adapter card or wireless communication adapter. Application programs 411 on computing device 400 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise e.g., copper wires, optical fibers, wireless transmission, routers, firewalls, switches, gateway computers, and edge servers.

Computing device 400 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for window placement, comprising:
    gathering data of user preferences of size and position of windows in a visual display through use of the visual display, wherein windows relate to resources accessed by a user of a data processing system and wherein gathering data of user preferences further comprises gathering window data from one or more of an operating system and screen capture;
    determining, automatically and upon a new display action, a current context of the visual display, wherein the current context includes existing windows in the visual display and a position and activity of a mouse on the visual display; and
    applying, automatically, the data of user preferences to the new display action to provide an updated display context, wherein the applying includes influencing one or more sizes and one or more positions of one or more windows in the visual display based on where the user would prefer to have a window open in relation to the position and activity of the mouse.

2. The method of claim 1, wherein the user preferences relate to resource categories of windows;
    wherein the new display action is opening a window for a resource in the visual display; and
    wherein applying the data of user preferences further comprises applying a function of a size and a position of a window of a same category of resource.

3. The method of claim 1, wherein the new display action is a change to a number of monitors in the visual display and wherein applying the data of user preferences further comprises influencing one or more sizes and one or more positions of multiple windows across one or more monitors.

4. The method of claim 1, wherein gathering data of user preferences further comprises gathering data when a new window is displayed.

5. The method of claim 1, further comprising:
    monitoring a user reaction to the updated display context, and wherein the user reaction comprises movement of one or more windows; and
    adding the user reaction to the data of user preferences.

6. The method of claim 1, further comprising:
    rearranging one or more existing windows in the current context of the display to accommodate the new display action.

7. The method of claim 6, wherein rearranging one or more existing windows is dependent on one or more types of content of the existing windows.

8. The method of claim 1, wherein providing the updated display context includes applying a decision tree to result in a nearest matching updated display context, and wherein the nearest matching updated display context accommodates the new display action with a least movement of existing windows.

9. A system for window placement, comprising:
    one or more processors; and
    a memory communicatively coupled to the one or more processors,
    wherein the memory comprises instructions which, when executed by the one or more processors, cause the one or more processors to perform a method comprising:
    gathering data of user preferences of size and position of windows in a visual display through use of the visual display, wherein windows relate to resources accessed by a user of a data processing system;
    determining, automatically and upon a new display action, a current context of the visual display, wherein the current context includes existing windows in the visual display and a portion of the display that is changing; and
    applying, automatically, the data of user preferences to the new display action to provide an updated display context, wherein the applying includes:
        influencing one or more sizes and one or more positions of one or more windows in the visual display based on where the user would prefer to have a window open in relation to the portion of the display that is changing; and
        restricting a window from being moved to the portion of the display that is changing.

10. The system of claim 9, wherein the user preferences relate to resource categories of windows;
   wherein the new display action is opening a window for a resource in the visual display; and
   wherein applying the data of user preferences further comprises applying a function of a size and a position of a window of a same category of resource.

11. The system of claim 9, wherein the new display action is a change to a number of monitors in the visual display and wherein applying the data of user preferences further comprises influencing one or more sizes and one or more positions of multiple windows across one or more monitors.

12. The system of claim 9, wherein gathering data of user preferences further comprises gathering window data from one or more of an operating system and screen capture.

13. The system of claim 9, wherein gathering data of user preferences further comprises gathering data when a new window is displayed.

14. The system of claim 9, further comprising:
   monitoring a user reaction to the updated display context, and wherein the user reaction comprises movement of one or more windows; and
   adding the user reaction to the data of user preferences.

15. The system of claim 9, further comprising:
   rearranging one or more existing windows in the current context of the display to accommodate the new display action.

16. The system of claim 9, wherein providing the updated display context includes applying a decision tree to result in a nearest matching updated display context, and wherein the nearest matching updated display context accommodates the new display action with a least movement of existing windows.

17. A computer program product for window placement, the computer program product comprising a computer readable storage medium having program instructions embodied therewith, the program instructions executable by a processor to cause the processor to:
   gather data of user preferences of size and position of windows in a visual display through use of the visual display, wherein windows relate to resources accessed by a user of a data processing system;
   determine, automatically and upon a new display action, a current context of the visual display, wherein the current context includes existing windows in the visual display and a portion of the display that is changing; and
   applying the data of user preferences to the new display action to provide an updated display context, wherein the applying includes:
      influencing one or more sizes and one or more positions of one or more windows in the visual display based on where the user would prefer to have a window open in relation to the portion of the display that is changing; and
      restricting a window from being moved to the portion of the display that is changing;
   wherein the computer-readable storage medium is not a transitory signal per se.

18. The method of claim 1, wherein applying the data of user preferences comprises restricting a window from being moved to the position of the mouse.

\* \* \* \* \*